United States Patent
Oh et al.

(10) Patent No.: US 10,753,844 B2
(45) Date of Patent: Aug. 25, 2020

(54) PARTICULATE MATTER SENSOR

(71) Applicant: AMOTECH CO., LTD., Incheon (KR)

(72) Inventors: Soo Min Oh, Seoul (KR); Yeon Soo Chung, Incheon (KR); Sung Jin Hong, Gyeonggi-do (KR); Eun Ji Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 158 days.

(21) Appl. No.: 16/088,400

(22) PCT Filed: Mar. 30, 2017

(86) PCT No.: PCT/KR2017/003473
§ 371 (c)(1),
(2) Date: Sep. 25, 2018

(87) PCT Pub. No.: WO2017/171424
PCT Pub. Date: Oct. 5, 2017

(65) Prior Publication Data
US 2020/0158617 A1 May 21, 2020

(30) Foreign Application Priority Data
Mar. 31, 2016 (KR) .................. 10-2016-0039736

(51) Int. Cl.
G01N 15/06 (2006.01)
(52) U.S. Cl.
CPC ..... *G01N 15/0656* (2013.01); *G01N 15/0606* (2013.01)
(58) Field of Classification Search
CPC .................................................. G01N 15/0656
See application file for complete search history.

(56) References Cited

U.S. PATENT DOCUMENTS 6,634,210 B1 * 10/2003 Bosch ................ G01N 15/0656
 204/426
8,176,768 B2 * 5/2012 Kondo ............... G01N 15/0656
 73/23.33

(Continued)

FOREIGN PATENT DOCUMENTS

JP 2009-085959 4/2009
JP 2010-229957 10/2010

(Continued)

OTHER PUBLICATIONS

International Search Report issued in International Patent Application No. PCT/KR2017/003473, dated Aug. 18, 2017.

(Continued)

*Primary Examiner* — Paul M. West
*Assistant Examiner* — Mark A Shabman
(74) *Attorney, Agent, or Firm* — Norton Rose Fulbright US LLP

(57) ABSTRACT

A particulate matter sensor is provided that can include: an insulating substrate; a plurality of sensing electrodes which are disposed on one surface of the insulating substrate and spaced a predetermined interval from each other so as not to be electrically connected to each other; a connection electrode disposed to be coplanar with the plurality of sensing electrodes and connected to a connection terminal formed on the one surface of the insulating substrate to be connected to some or all of the plurality of sensing electrodes through deposited particulate matter; a plurality of terminals formed on the one surface of the insulating substrate and connected one-to-one with the plurality of sensing electrodes and the connection electrode; and a heater unit disposed inside the insulating substrate and configured to provide heat for removing the particulate matter deposited on the sensing electrodes.

7 Claims, 6 Drawing Sheets

(56) References Cited

U.S. PATENT DOCUMENTS

| | | | |
|---|---|---|---|
| 8,382,884 B2* | 2/2013 | Okayama | G01N 27/226 60/275 |
| 2009/0217737 A1* | 9/2009 | Dorfmueller | F01N 11/00 73/28.01 |
| 2011/0030451 A1* | 2/2011 | Roesch | F02D 41/1466 73/28.02 |
| 2011/0283773 A1* | 11/2011 | Suzuki | G01K 13/02 73/25.05 |
| 2012/0103059 A1* | 5/2012 | Kimata | F01N 11/00 73/23.33 |
| 2012/0119759 A1* | 5/2012 | Nelson | F02D 41/1466 324/691 |
| 2013/0283886 A1* | 10/2013 | Teranishi | G01N 15/0606 73/23.31 |

FOREIGN PATENT DOCUMENTS

| | | |
|---|---|---|
| JP | 2011-247650 | 12/2011 |
| JP | 2012/052811 | 3/2012 |
| KR | 10-1593669 | 2/1916 |
| KR | 2015-0010218 | 1/2015 |

OTHER PUBLICATIONS

Office Action Issued in Corresponding Japanese Application No. 2018551864, dated Jul. 30, 2019.

\* cited by examiner

PARTICULATE MATTER SENSOR

CROSS-REFERENCE TO RELATED APPLICATIONS

This application is a national phase application under 35 U.S.C. § 371 of International Application No. PCT/KR2017/003473, filed Mar. 30, 2017, which claims priority to and the benefit of Korean Patent Application No. 10-2016-0039736, filed Mar. 31, 2016. The contents of the referenced patent applications are incorporated into the present application by reference.

FIELD OF THE DISCLOSURE

The present invention relates to a particulate matter sensor, and more specifically, to a particulate matter sensor capable of achieving a constant capacitance regardless of temperature and reducing the amount of expensive materials, such as platinum, in order to reduce a production cost.

DESCRIPTION OF RELATED ART

Generally, since exhaust gas regulations have been further tightened, there is growing interest in post-processing apparatus for purifying exhaust gases. Particularly, particulate matter (PM) regulations of diesel vehicles have been further tightened.

As a part of the interest, the most efficient and practical technology for reducing PM is an exhaust gas reduction apparatus.

Meanwhile, in order to diagnose the failure of the exhaust gas reduction apparatus, a PM sensor is installed at a rear end of a diesel particulate filter (DPF), and the PM sensor is divided into a resistance type PM sensor or a capacitance type PM sensor.

Among the above-described sensors, the capacitance type PM sensor may include a plurality of external electrodes disposed in parallel on a surface, a plurality of internal electrodes disposed above/under the plurality of external electrodes, and may measure a capacitance between the external electrodes and the internal electrodes using an area of PM deposited between the external electrodes and a distance between the external electrodes and the internal electrodes to easily detect PM which passes through an exhaust gas particulate filter and is discharged toward a downstream.

Here, the plurality of external electrodes include sensing parts on which PM is deposited and capacitor parts for measuring a capacitance between the external electrodes and the internal electrodes, and the sensing parts and the capacitor parts are formed adjacent to each other. Accordingly, in a case in which the sensing parts on which the PM is deposited are exposed to high temperature exhaust gases, the capacitor parts formed adjacent to the sensing parts are also affected by a temperature transmitted from the exhaust gases.

Meanwhile, in the case of an insulating substrate, a sharp change in dielectric constant occurs due to properties of a material thereof in a high temperature environment.

As an example, in a case in which the insulating substrate is formed of alumina, a sharp change in dielectric constant occurs at a temperature of about 600° C.

Accordingly, in a case in which the sensing parts are exposed to a high temperature environment of a temperature of 600° C. or more, since the capacitor parts formed adjacent to the sensing parts are affected by the high temperature, there is a problem in that a constant capacitance between the external electrodes and internal electrodes is difficult to achieve due to a sharp change in dielectric constant.

That is, in the case in which the sensing parts are adjacent to the capacitor parts, there is a limitation in usage because a constant capacitance cannot be measured in a high temperature environment of a predetermined temperature or more.

In addition, in the case of alumina used as a material of the insulating substrate, since a dielectric constant thereof is very low in the range of 10 to 20, the capacitor parts have to be designed to have a large area to achieve a desired capacitance value. Accordingly, since an excessive amount of expensive materials, such as platinum, is needed to form the capacitor parts, there is a problem in that a production cost increases.

SUMMARY OF THE INVENTION

The present invention is directed to providing a particulate matter sensor capable of achieving a constant capacitance regardless of temperature.

In addition, the present invention is also directed to providing a particulate matter sensor capable of decreasing the amount of expensive materials, such as platinum, to reduce a production cost and easily achieve a desired capacitance.

One aspect of the present invention provides a particulate matter sensor including: an insulating substrate; a plurality of sensing electrodes which are disposed on one surface of the insulating substrate and spaced a predetermined interval from each other so as not to be electrically connected to each other; a connection electrode disposed to be coplanar with the plurality of sensing electrodes and connected to a connection terminal formed on the one surface of the insulating substrate to be connected to some or all of the plurality of sensing electrodes through deposited particulate matter; a plurality of terminals formed on the one surface of the insulating substrate and connected one-to-one with the plurality of sensing electrodes and the connection electrode; and a heater unit disposed inside the insulating substrate and configured to provide heat for removing the particulate matter deposited on the sensing electrodes.

The plurality of terminals connected one-to-one with the sensing electrodes may be connected one-to-one with a plurality of capacitors separately provided outside the insulating substrate.

The plurality of capacitors may be connected in parallel.

The plurality of capacitors may be included in a controller of a vehicle.

Each of the plurality of sensing electrodes may include a sensing part having a predetermined area and a lead portion which connects the sensing part to the terminal, the connection electrode may include a plurality of extended electrodes which extend in a direction parallel to the sensing part, and the sensing part may be interposed between the extended electrodes which are adjacent to each other.

Any one of the plurality of extended electrodes may be connected to the connection terminal through a lead portion.

The lead portion may have a smaller width than the sensing part.

A temperature sensing part configured to control the heater unit may be disposed inside the insulating substrate.

According to the present invention, since capacitor parts for detecting a change in capacitance are externally formed as a separate component, a constant capacitance can be achieved regardless of temperature.

In addition, since the present invention does need expensive materials to form the capacitor parts, a production cost can be reduced, and since the capacitance parts can be freely formed with a desired capacitance, a degree of design freedom can be improved.

DETAILED DESCRIPTION OF THE INVENTION

Figure 1:
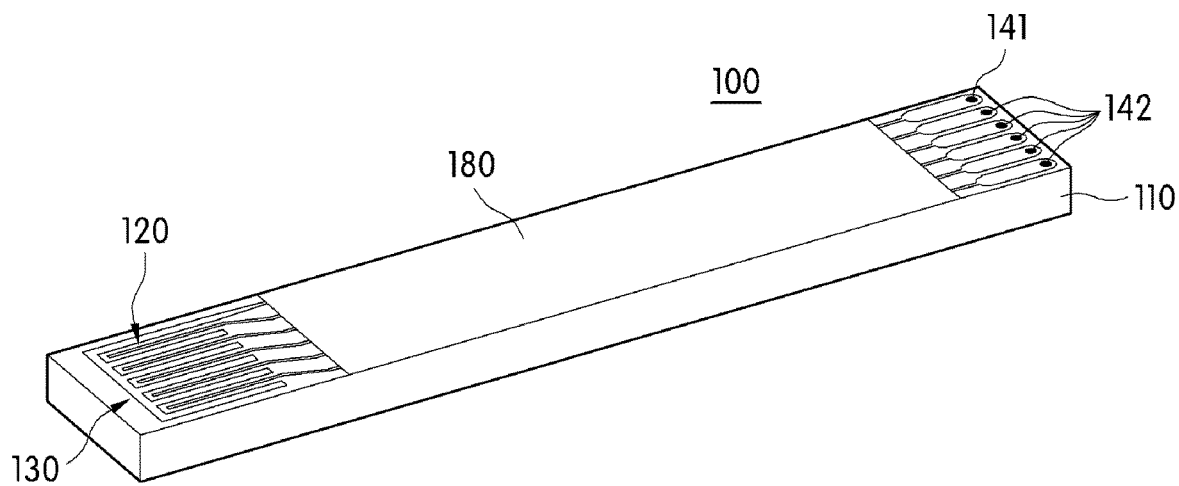
FIG. 1 is a schematic view illustrating a particulate matter sensor according to one embodiment of the present invention.

Hereinafter, the present invention will be described in detail with reference to the accompanying drawings in order for those skilled in the art to easily realize the present invention. The present invention may be implemented in several different forms and is not limited to embodiments described herein. Parts irrelevant to description are omitted in the drawings in order to clearly describe the embodiments of the present invention, and similar components are denoted by similar reference numerals throughout this specification.

Figure 6:
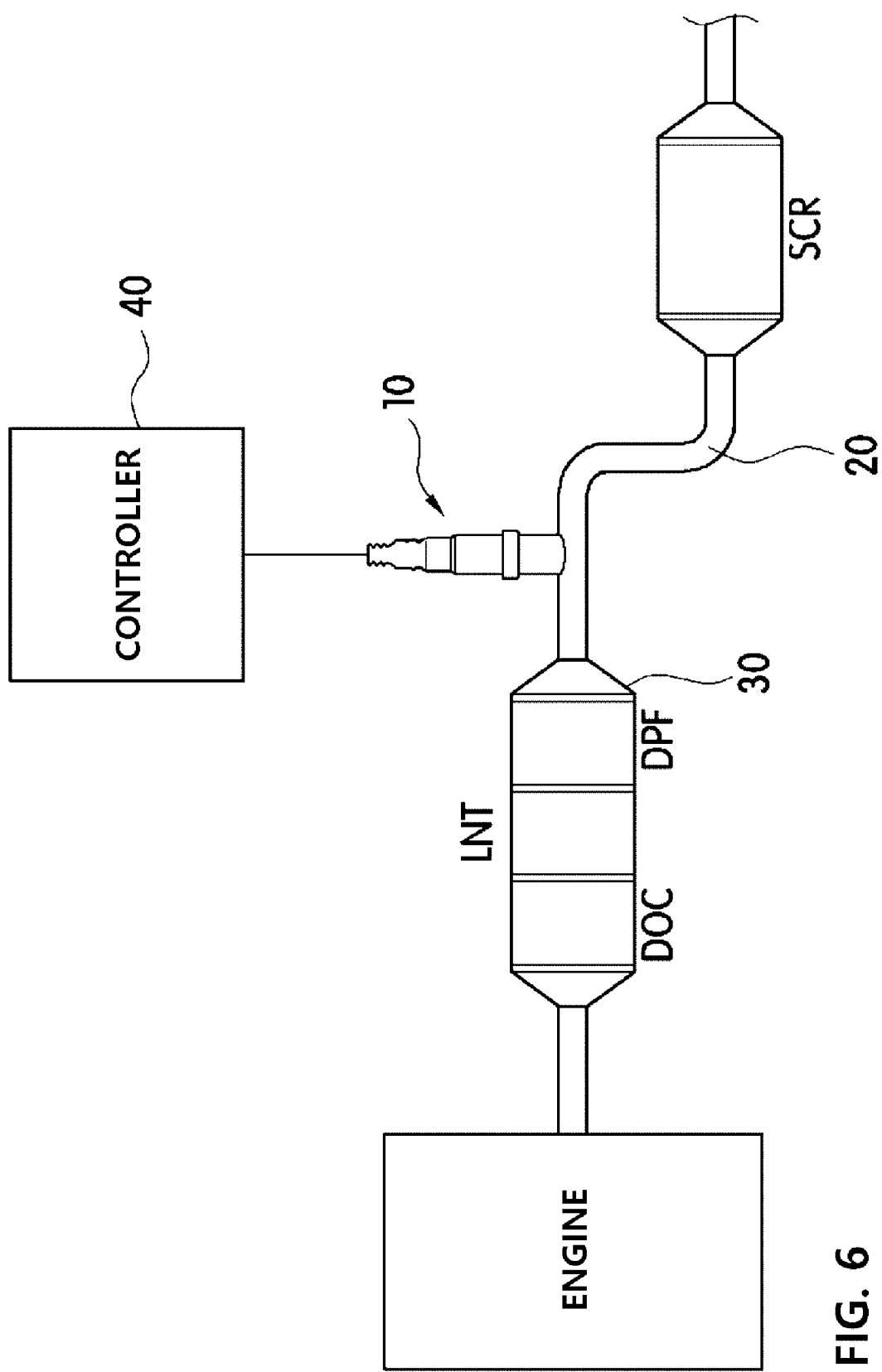
FIG. 6 is a schematic view illustrating an installation position of the particulate matter sensor according to one embodiment of the present invention.

As illustrated in FIG. 6, a particulate matter sensor 100 according to one embodiment of the present invention is a sensor, which is installed at a side of an exhaust pipe 20 connected to a rear end of an exhaust gas particulate filter 30 connected to an exhaust manifold of a vehicle, and detects particulate matter P passing through the exhaust gas particulate filter 30 and exhaust pipe and discharged toward a downstream.

Figure 2:
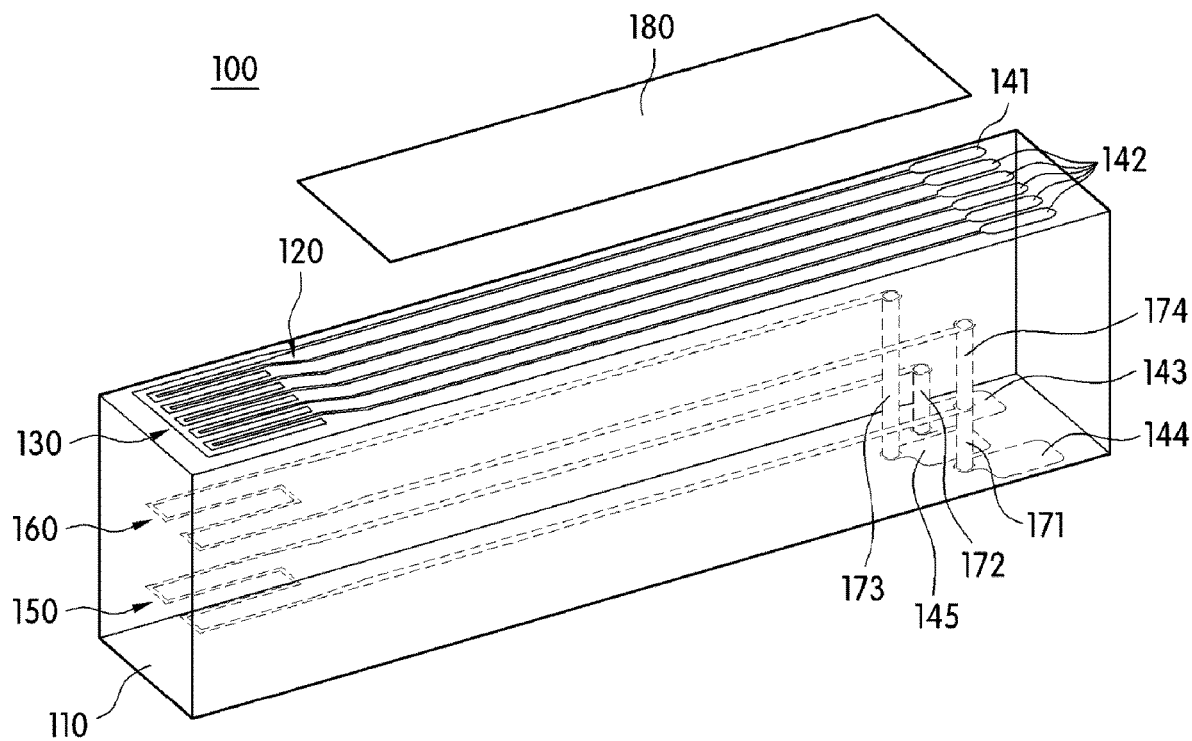
FIG. 2 is a schematic view illustrating arrangement relations between main components of FIG. 1.
Figure 3:
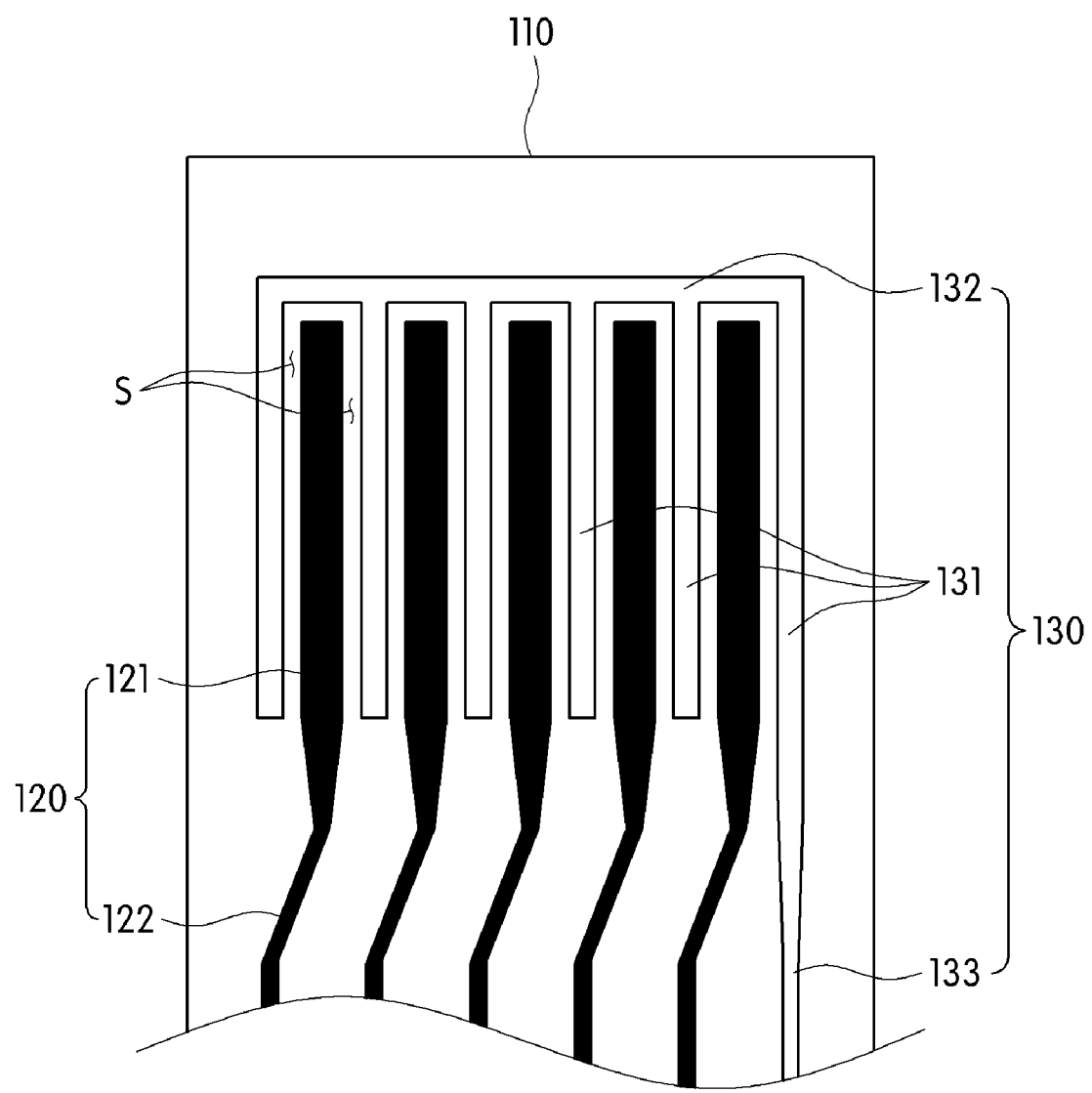
FIG. 3 is a partially enlarged view illustrating arrangement relations between sensing electrodes and connection electrodes applied to the particulate matter sensor according to one embodiment of the present invention.
Figure 4:
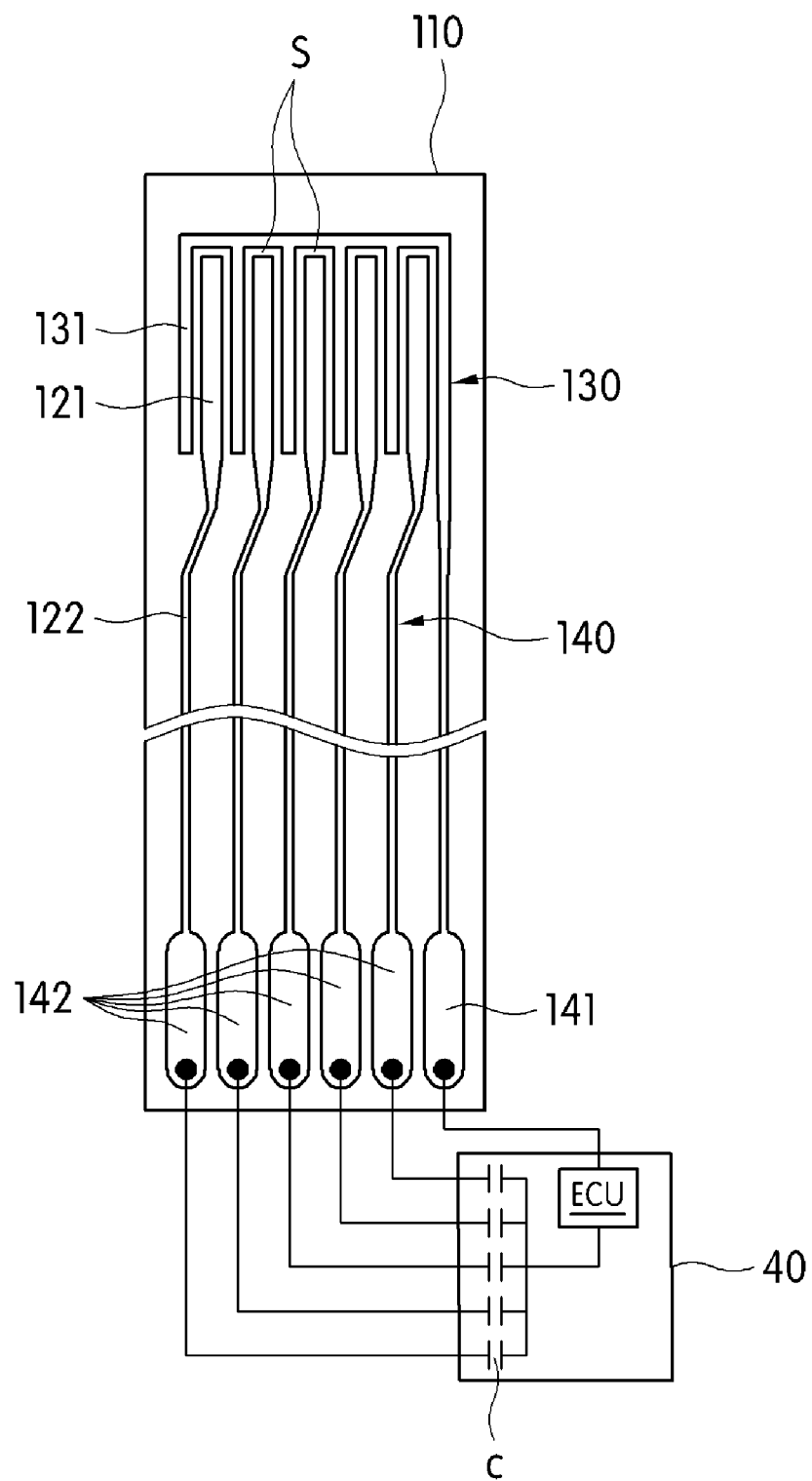
FIG. 4 is a conceptual view illustrating electric connection relation between the particulate matter sensor according to one embodiment of the present invention and capacitors separately provided at the outside.

As illustrated in FIGS. 1 and 2, the particulate matter sensor 100 includes an insulating substrate 110, sensing electrodes 120, a connection electrode 130, terminals 141 and 142, and a heater unit 150.

A plurality of insulating layers may be stacked in a height direction to form the insulating substrate 110, and the insulating substrate 110 may be formed of a heat resistive insulator such as a glass material, a ceramic material, spinel, or titanium dioxide.

As an example, the insulating substrate 110 may be alumina or zirconia toughened alumina (ZTA).

Here, at least one sensing electrode 120 and the connection electrode 130 are disposed to be coplanar on one surface of the insulating substrate 100, and in a case in which particulate matter passing through the exhaust pipe 20 is deposited on the surface, the at least one sensing electrode 120 and the connection electrode 130 are electrically connected, and thus whether the particulate matter is discharged can be detected.

That is, the plurality of sensing electrodes 120 may not be electrically connected and may be spaced by predetermined intervals in a width direction of the insulating substrate 110 on the surface of the insulating substrate 100, and one connection electrode 130 may be spaced apart from the sensing electrodes 120 by predetermined intervals in order to not be electrically connected to the sensing electrodes 120.

Accordingly, when the particulate matter P is deposited in deposition spaces S between the connection electrode 130 and the sensing electrodes 120, the connection electrode 130 and the sensing electrodes 120 are electrically connected through the deposited particulate matter.

Here, the plurality of sensing electrodes 120 may include sensing parts 121 having predetermined areas, and the sensing parts 121 may be formed at end portions of the sensing electrodes 120. In addition, the connection electrode 130 may include a plurality of extended electrodes 131 which have predetermined lengths, which may extend in a direction parallel to the sensing part 121 from a coupling electrode 132 formed in a direction parallel to the width direction of the insulating substrate 100, and which may be electrically connected to the coupling electrode 132.

Here, the extended electrodes 131 may have lengths corresponding to those of the sensing parts 121, and the sensing parts 121 may be spaced apart from each other between a pair of the extended electrodes 131 which are adjacent to each other.

Accordingly, the deposition spaces S, in which particulate matter are deposited, are formed between the extended electrodes 131 and the sensing parts 121 which are alternately disposed in the width direction of the insulating substrate 100.

Accordingly, when particulate matter is deposited in the deposition spaces S, the sensing electrodes 120 and the connection electrode 130 which have not been electrically connected are electrically connected by connecting the sensing parts 121 and the extended electrodes 131, which are adjacent to each other, through the particulate matter.

That is, the plurality of sensing electrodes 120 which have not been electrically connected may be sequentially connected to the connection electrode 130 through the particulate matter deposited in the deposition spaces S.

In addition, as illustrated in the particulate matter sensor 100 according to one embodiment of the present invention, when the sensing parts 121 are disposed between the adjacent extended electrodes 123, since the number of deposition spaces S in which particulate matter can be deposited between the sensing parts 121 and the extended electrodes 131 may increase and areas of the deposition spaces S may also be small, a response time can decrease.

Meanwhile, the plurality of sensing electrodes 120 may be connected to match one-to-one with a plurality of capacitors C.

Here, the plurality of capacitors C may be separately formed outside the insulating substrate 100, and in a case in which the particulate matter sensor 100 is installed such that the sensing parts 121 are exposed to the exhaust pipe 20, the plurality of capacitors C may be electrically connected one-to-one with the plurality of sensing electrodes 120.

As an example, the plurality of capacitors C may be provided as independent elements in a controller 40 such as an electronic control unit (ECU) configured to control overall driving of a vehicle, and the plurality of capacitors C may be connected in parallel.

Accordingly, when particulate matter is deposited in the deposition spaces S and the plurality of sensing electrodes 120 are sequentially connected to the connection electrode 130, since the number of capacitors C electrically connected one-to-one with the sensing electrodes 120 also increases, an entire capacitance changes, an amount of particulate matter contained in exhaust gases is detected, and thus whether the exhaust gas particulate filter 30 is broken may be measured exactly.

In addition, since the capacitors C for detecting a change in capacitance are provided as components at the outside, for example, at a side of the controller 40 of the vehicle, which is not a side of the particulate matter sensor 100, the capacitors C having desired capacitances can be freely formed.

In addition, since the capacitors C are provided outside the particulate matter sensor 100, a value of a change in capacitance may be measured exactly without being affected by a temperature of exhaust gases. More specifically, since the sensing parts 121 serve to increase areas of the sensing electrodes 120 and the connection electrode 130 through particulate matter deposited in the deposition spaces S, the sensing parts 121 are not largely affected even when exposed to a high temperature environment. However, in a case in which the capacitors for measuring a change in capacitance are formed inside the particulate matter sensor 100, a constant capacitance is achieved at a predetermined temperature or less according to a material used in the insulating substrate 110, but a sharp change in dielectric constant occurs at a predetermined high temperature or more, and thus a change in capacitance is difficult to measure accurately.

As an example, in a case in which the insulating substrate 110 is formed of a ceramic material, a sharp change in dielectric constant occurs at a temperature of about 600° C. due to a property of the material. Accordingly, when the capacitors are formed adjacent to the sensing parts 121 exposed to exhaust gases, since the capacitors are affected by a temperature, a constant capacitance may not be achieved in a high temperature environment of a predetermined temperature or more, accurate measurement is difficult, and thus there is a limitation in using the capacitors.

However, since the capacitors C are separately provided outside the particulate matter sensor 100 according to the present invention, even when a sharp change in dielectric constant occurs in the insulating substrate 110 at a high temperature, a constant capacitance can be achieved.

In addition, even when the sensing parts 121 are heated by the heater unit 150 which will be described below, the particulate matter sensor 100 can be immediately used without a delay time.

In addition, since capacitors for measuring a change in capacitance do not need to be formed in the particulate matter sensor 100, an amount of expansive material, such as platinum, used as an electrode material forming capacitors dramatically decreases so that a manufacturing cost can be reduced.

To this end, the plurality of terminals 141 and 142 are formed on one surface of the insulating substrate 100. Here, the plurality of terminals 141 and 142 may include the first terminal 141, which is electrically connected to the connection electrode 130, and a plurality of second terminals 142, which are connected one-to-one with the plurality of sensing electrodes 120, but the plurality of terminals 141 and 142 are not electrically connected.

Figure 5:
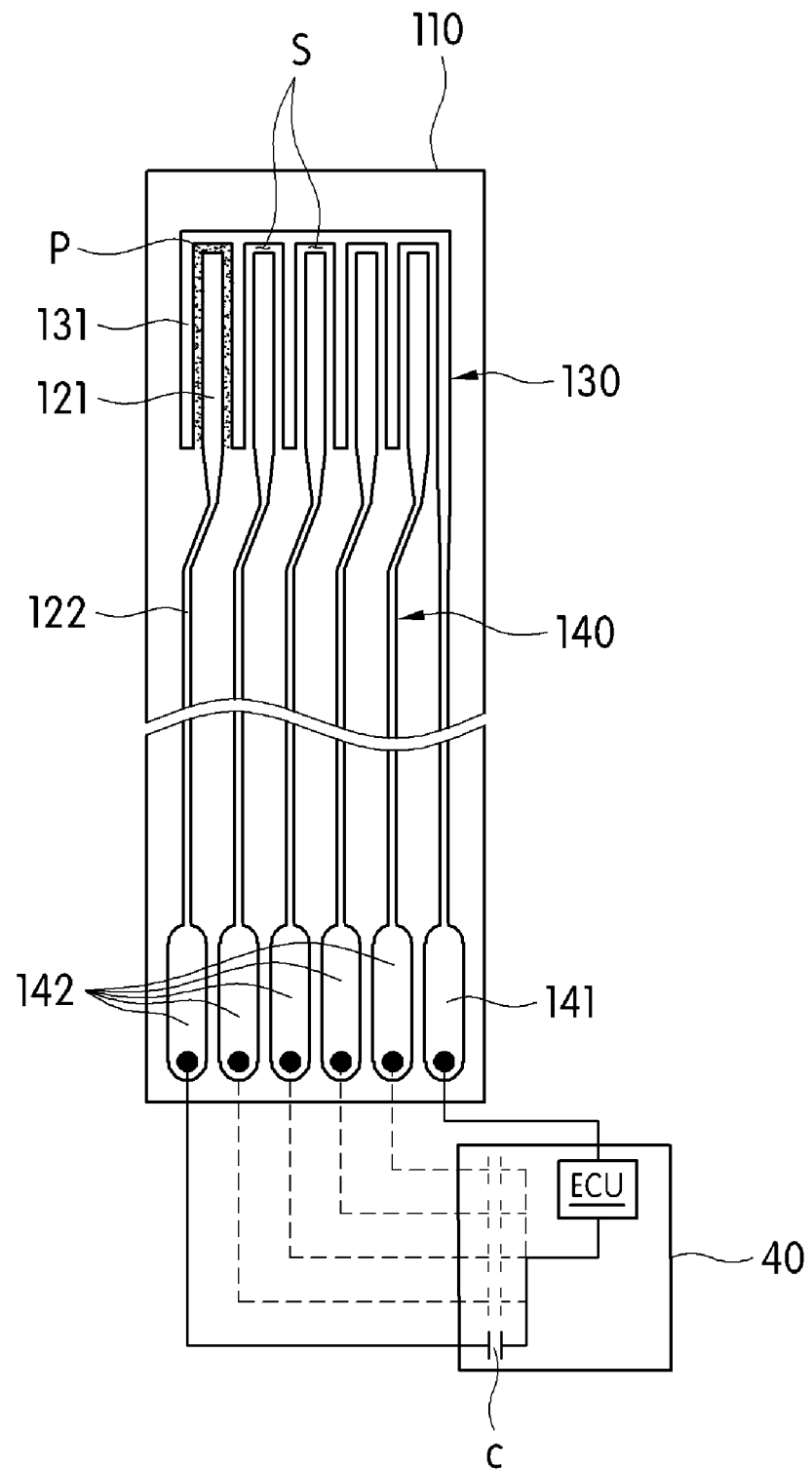
FIG. 5 is a view illustrating an operation state of FIG. 4.

Accordingly, the connection electrode 130 and the sensing electrodes 120 are connected one-to-one with the plurality of terminals 141 and 142, and only when particulate matter is deposited in the deposition spaces S, some or an entirety of the plurality of sensing electrodes 120 are connected to the connection electrode 130 to form a closed loop with some or an entirety of the plurality of above-described capacitors C (see FIG. 5).

Here, the connection electrode 130 may be connected to the first terminal 141 through a lead portion 133 extending from one end of any one among the plurality of extended electrodes 131 having predetermined lengths, and the plurality of sensing electrodes 120 may be connected to the plurality of second terminals 142 through lead portions 122, which extend from the sensing parts 121, having predetermined lengths. In this case, as widths of the lead portions 122 and 133 are less than those of the sensing parts 121 and/or the extended electrodes 131, an amount of materials used for forming the electrodes can also be decreased.

Here, the lead portions 122 and 133 may also be covered by a separate insulation layer 180 stacked on one surface of the insulating substrate 100 in order to not be exposed to the outside and to be insulated from each other.

However, the present invention is not limited thereto, and one among the plurality of extended electrodes 131 of the connection electrode 130 may also be directly connected to the first terminal 141, and ends of the sensing parts 121 of the plurality of sensing electrodes 120 may also be directly connected to the plurality of second terminals 142.

The heater unit 150 may provide heat to the sensing parts 121 to remove deposited particulate matter from the deposition spaces S, may be disposed inside the insulating substrate 110, and may be disposed under the sensing parts 121. Here, both ends of the heater unit 150 may be connected to a third terminal 143 and a fourth terminal 144 provided on a lower surface of the insulating substrate 110 through via holes 171 and 172.

Since the heater unit 150 heats a side of the sensing parts 121 using heat generated when power is supplied, particulate matter deposited in the deposition spaces S can be removed.

Meanwhile, the insulating substrate 110 may include a temperature sensing part 160 for measuring a temperature inside the insulating substrate 110 or the sensing parts 121. The temperature sensing part 160 may be interposed between the sensing parts 121 and the heater unit 150 inside the insulating substrate 110.

Both ends of the temperature sensing part 160 may be electrically connected to the heater unit 150 and a fifth terminal 165 through via holes 173 and 174.

Specifically, one end of the both ends of the temperature sensing part 160 may be electrically connected to the heater unit 150 through the via hole 174 connected to the heater unit 150, and the other end of the temperature sensing part 160 may be electrically connected to the fifth terminal 165 formed on the lower surface of the insulating substrate 110 via the via hole 173.

Here, the fifth terminal 165 formed on the lower surface of the insulating substrate 110 is not electrically connected to the third terminal 163 and the fourth terminal 164.

Accordingly, the controller 40 of the vehicle may compare a temperature measured by the temperature sensing part 160 and a temperature measured by a temperature sensor (not shown) installed in the vehicle to control the heater unit 150 configured to provide heat to the sensing parts 121.

Meanwhile, an installation area of the temperature sensing part 160 may be less than or equal to an area of the heater unit 150 such that the temperature sensing part 160 is positioned within an installation area of the heater unit 150.

The particulate matter sensor 100 having the above-described configuration may be embedded in a housing 10 and installed at the exhaust pipe 20.

Figure 7:
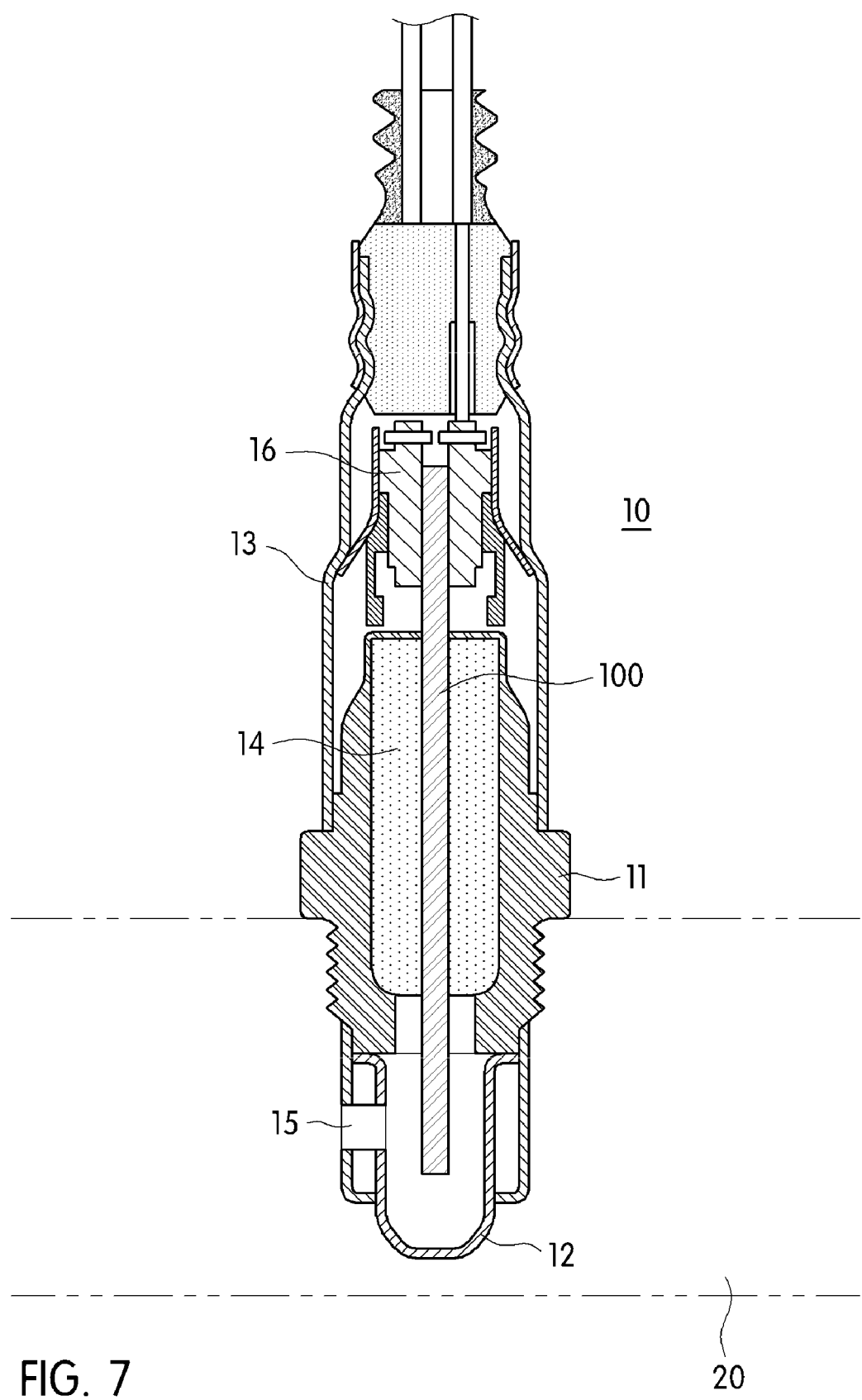
FIG. 7 is a view illustrating an installation state in which the particulate matter sensor according to one embodiment of the present invention is embedded in a housing.

As an example, the housing 10 may include a body portion 11, a first protection cover 12 provided at one side of the body portion 11, and a second protection cover 13 provided at the other side of the body portion 11 as illustrated in FIG. 7.

The body portion 11 has an inner space for accommodating the particulate matter sensor 100 and is fixedly coupled to the exhaust pipe. As both ends of the body portion 11 are open, both ends of the particulate matter sensor 100 inserted into the inner space are exposed to the outside.

That is, the side of the sensing parts 124 of the particulate matter sensor 100 is exposed to one side of the body portion 11, and the plurality of terminals of the particulate matter sensor 100 are exposed to the other side of the body portion 11.

In addition, a sealing member 14 for wrapping the particulate matter sensor 100, which is inserted into the inner space, to fix a position of the particulate matter sensor 100 and preventing introduction of fluid may fill the inner space of the body portion 11.

The first protection cover 12 is coupled to one side of the body portion 11 and protects the end of the particulate matter sensor 100 protruding from the body portion 11, for example, the side of the sensing parts 124.

Here, at least one opening 15 for introducing exhaust gases may be formed at a side of the first protection cover 12 such that the sensing parts 124 are exposed to the exhaust gases.

The second protection cover 13 is coupled to the other side of the body portion 11 and protects the other end of the particulate matter sensor 100 protruding from the body portion 11, for example, a side of the plurality of terminals.

Here, since a cable connector 16 protruding from the body portion 11 and coupled to the end of the particulate matter sensor 100 protruding inward in the second protection cover 13 is provided at a side of the second protection cover 13, the first to fifth terminals 161, 162, 163, 164, and 165 are connected to the controller 40 of the vehicle.

Meanwhile, the plurality of capacitors C which are connected one-to-one with the sensing electrodes 120 of the particulate matter sensor 100 according to the present invention and provided in the controller 40 of the vehicle have been illustrated and described, but are not limited thereto, and the plurality of capacitors C may also be provided in an auxiliary controller (not shown) controlled by the controller 40 of the vehicle.

As described above, while the embodiment of the present invention has been described, the spirit of the present invention is not limited to the suggested embodiment, other embodiments may be easily suggested by those skilled in the art by adding, modifying, and deleting other components in the same spirit of the present invention, and this may also fall within the scope of the present invention.

The invention claimed is:

1. A particulate matter sensor comprising:
an insulating substrate;
a plurality of sensing electrodes which are disposed on one surface of the insulating substrate and spaced a predetermined interval from each other so as not to be electrically connected to each other;
a connection electrode disposed to be coplanar with the plurality of sensing electrodes to be connected to some or all of the plurality of sensing electrodes through deposited particulate matter;
a plurality of terminals formed on the one surface of the insulating substrate and connected one-to-one with the plurality of sensing electrodes and the connection electrode; and
a heater unit disposed inside the insulating substrate and configured to provide heat for removing the particulate matter deposited on the sensing electrodes,
wherein:
each of the plurality of sensing electrodes includes a sensing part having a predetermined area and a lead portion which connects the sensing part to the terminal;
the connection electrode includes a plurality of extended electrodes which extend in a direction parallel to the sensing part; and
the sensing part is interposed between the extended electrodes which are adjacent to each other.

2. The particulate matter sensor of claim 1, wherein the plurality of terminals connected one-to-one with the sensing electrodes are connected one-to-one with a plurality of capacitors separately provided outside the insulating substrate.

3. The particulate matter sensor of claim 2, wherein the plurality of capacitors are connected in parallel.

4. The particulate matter sensor of claim 2, wherein the plurality of capacitors are included in a controller of a vehicle.

5. The particulate matter sensor of claim 1, wherein any one of the plurality of extended electrodes is connected to a connection terminal through a lead portion.

6. The particulate matter sensor of claim 1, wherein the lead portion has a smaller width than the sensing part.

7. The particulate matter sensor of claim 1, wherein a temperature sensing part configured to control the heater unit is disposed inside the insulating substrate.

* * * * *